April 17, 1962 M. E. CHANDLER ETAL 3,029,599
JET ENGINE AFTERBURNER FUEL CONTROL
Filed Jan. 21, 1953 3 Sheets-Sheet 1

INVENTORS
MILTON E. CHANDLER
DONALD E. LIPFERT
BY
ATTORNEY

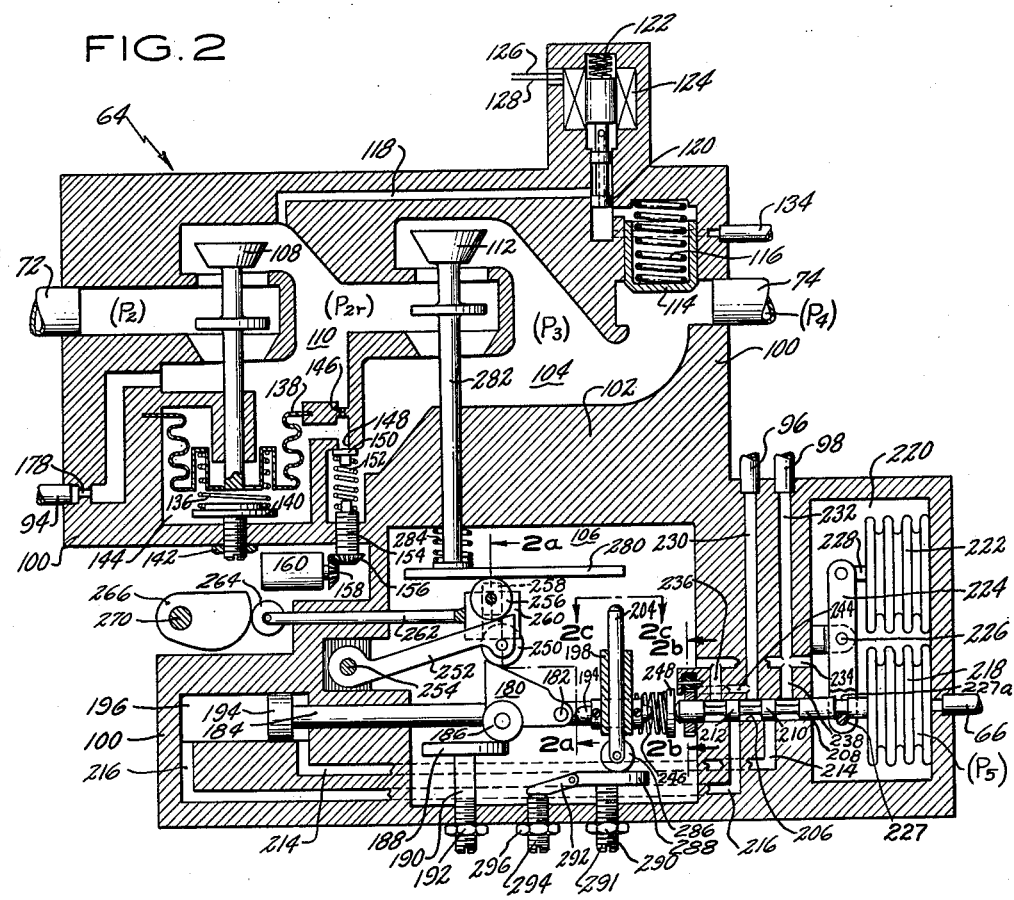

April 17, 1962  M. E. CHANDLER ETAL  3,029,599
JET ENGINE AFTERBURNER FUEL CONTROL
Filed Jan. 21, 1953  3 Sheets-Sheet 3
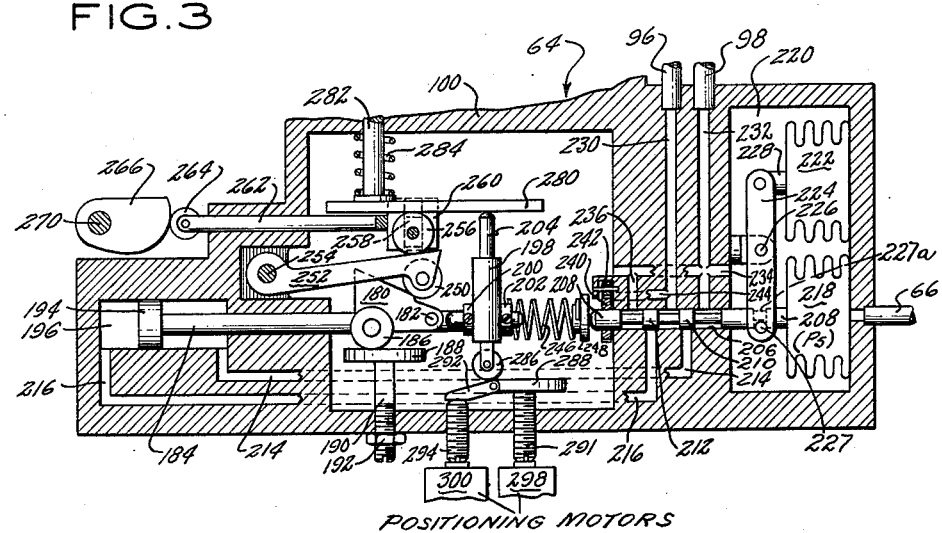
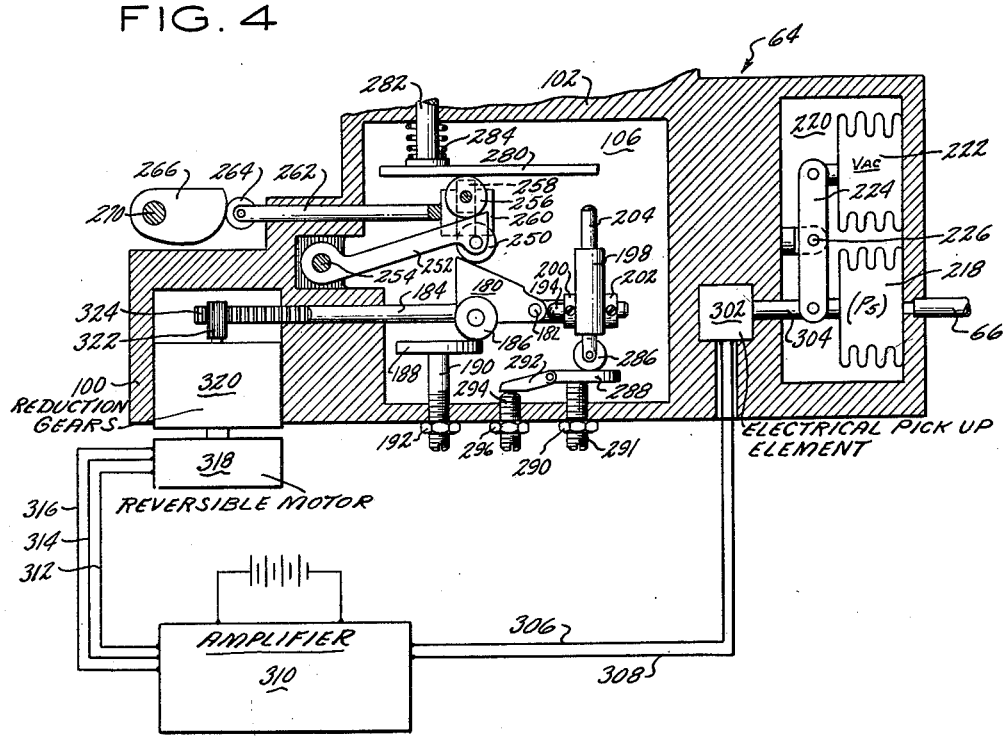
INVENTORS
MILTON E. CHANDLER
DONALD E. LIPFERT
BY
ATTORNEY

United States Patent Office 3,029,599
Patented Apr. 17, 1962

3,029,599
JET ENGINE AFTERBURNER FUEL CONTROL
Milton E. Chandler, Kensington, and Donald E. Lipfert, South Meriden, Conn., assignors, by mesne assignments, to Chandler-Evans Corporation, West Hartford, Conn., a corporation of Delaware
Filed Jan. 21, 1953, Ser. No. 332,202
10 Claims. (Cl. 60—35.6)

This invention pertains to fuel control apparatus for turbojet engines suitable for jet-propulsion or combined propeller-and-jet (prop-jet) propulsion of aircraft, and more particularly has reference to fuel control apparatus for such engines which comprise a gas turbine, for supplying part of the propulsion power of the engine, and a supplementary combustion chamber, on the discharge side of said turbine, for reheating the exhaust gases from said turbine to increase the jet reaction thrust of the engine when maximum power output is desired.

Engines of this type usually comprise, as principal elements, an air inlet, an air compressor, one or more main combustion chambers having a series of burner nozzles through which the main fuel supply is fed, a gas turbine, a supplementary combustion chamber also having a series of burner nozzles through which the supplementary fuel supply is fed, and a tail pipe for discharging the combustion gases to the atmosphere in the form of a jet. Associated with the engine are a main fuel supply system, including a fuel pump and control apparatus, for delivering fuel to the main combustion chambers, and a supplementary fuel supply system, including a fuel pump and control apparatus, for delivering fuel to the afterburners in the supplementary combustion chamber. This invention is particularly concerned with the afterburner fuel control apparatus which controls the supplementary (jet) power of the engins as a function of the compressor discharge pressure and engine (tail pipe) temperature.

The maximum power output of an engine of the type referred to can be greatly increased, for limited periods of operation, by the use of a supplementary combustion chamber to reheat the exhaust gases from the turbine and thus augment the propulsive power of the jet of exhaust gases discharged into the atmosphere. This increased power output is particularly beneficial when the aircraft is taking off from the ground, when climbing at a rapid rate and when maximum speed is required in maneuvering. However, when a supplementary combustion chamber is employed, it is essential that the reheating of the turbine exhaust gases be regulated in accordance with the compressor discharge pressure, and that the maximum permissible temperature in the tail pipe is not exceeded.

Modern aircraft engines, especially of the turbojet type are required to meet rigid standards of performance and reliability under an extremely wide range of adverse operating conditions that impose many severe requirements which a satisfactory afterburner fuel control must meet.

(1) Thus, flight altitudes vary from sea level to over 50,000 feet which causes variations in ambient atmospheric pressure of from 14.70 to 1.69 pounds per square inch, a nine-fold variation in ambient atmospheric pressure.

(2) The ambient temperature (as regards the afterburner fuel control) may vary from +300° F. to —65° F.

(3) The afterburner fuel control must start operating from a dry condition, owing to fuel evaporation at ambient low atmospheric pressures and high temperatures.

(4) Under these conditions, the following must be established within approximately 2 seconds:

(a) Pump starts
(b) Fuel control goes to work
(c) Fuel is injected into afterburner combustion chamber
(d) Combustion of fuel commences
(e) Jet thrust augmentation from afterburner is established (5) The capacity of the afterburner fuel control must vary from 3,000 to 38,000 pounds of fuel per hour, a ratio of increase of nearly 13:1. Indications are that this ratio may soon be increased to about 25:1.

(6) Afterburner fuel control mechanism must not freeze up when not in operation, even at lowest ambient temperatures. Inasmuch as the afterburner is not in operation during approximately 80 to 90% of engine running time, and thus no afterburner fuel flows during this time, the ambient temperature will take full effect on the afterburner fuel control.

(7) Afterburner fuel control must not become inoperative by reason of dirt in fuel.

(8) A turbojet engine of the type referred to, uses a duplex afterburner fuel manifold, with a flow divider which schedules the proportioning of fuel to the two manifolds. This causes substantial variations in fuel pressure level due to burner nozzle plugging, wide variations in turbine pump output, and wide variations in fuel boost pressure; despite all of which the afterburner fuel control must hold the fuel flow to the specified schedule within close limits.

(9) When the afterburner fuel control has been adjusted on an engine, it must hold that adjustment and repeat its operation performance in an acceptable manner. This requires close tolerances on hysteresis and repeatability, despite the wide range of metered fuel flow, e.g. 13:1.

(10) Although the afterburner fuel control must be dependably accurate in metering the scheduled fuel flow, independent sea level and high altitude adjustments of the control on the engine are required to meet:

(a) Variation (major) in sea level static fuel flow requirement between engines;
(b) Variation (minor) high altitude fuel flow requirement between engines;
(c) Difference in compressor discharge pressure sensing between engines;
(d) Variations in fuel characteristics;
(e) Changes in fuel requirements as the engine and afterburner deteriorate with use;
(f) Difference in fuel requirements of a given engine when moved from test stand to aircraft; and
(g) Apparent variation in fuel requirement of a given engine despite constant ambient and operating conditions.

(11) Experience has shown the need for independent adjustment of the afterburner fuel flow for "high altitude flight" and for "sea level, static operation of the engine" (i.e., with the aircraft on the ground and not in motion). Further, it is highly desirable that means be provided so that said sea level static adjustment (slope) can be made by the crew chief while the engine is running and the aircraft is stationary on the ground, and "separate," remotely controlled means be provided so that the pilot can adjust the high altitude flow during the initial flight.

(12) Throttle modulation is required as specified, and throttle modulation should be automatically prevented at high altitude.

(13) Afterburner fuel control should provide for contouring of fuel schedule.

(14) Afterburner fuel control should provide means of preventing the tail pipe temperature from exceeding a maximum safe limit.

Objects of this invention are:

(1) To provide an improved afterburner fuel control apparatus, associated with the main fuel control apparatus of the engine, which will control the delivery of fuel to the afterburners in accordance with the foregoing requirements.

(2) To provide an improved fuel control apparatus having novel means for closely regulating the afterburner fuel flow in accordance with the absolute discharge pressure of the compressor.

(3) To provide an improved apparatus which will control the delivery of fuel to the afterburners in accordance with a selected relationship with the temperature of the exhaust gases in the engine tail pipe.

(4) To provide an improved afterburner fuel control having means for adjusting the sea level static fuel flow (slope), and independent means for adjusting high altitude fuel flow.

(5) To provide an improved afterburner fuel control apparatus having means for modulating the static sea level fuel flow (slope) adjustment, and means for automatically limiting said modulation below a selected value of compressor discharge pressure.

(6) To provide an improved afterburner fuel control apparatus having means for recirculating the main engine fuel back to the fuel supply tank to prevent detrimental rise in temperature when the control apparatus is idle.

(7) To provide an improved afterburner fuel control apparatus with novel means to prevent sticking of the servo control valve, due to dirt in fuel and freezing.

With these and other objects in view which may be incident to our improvements, our invention consists in the combination and arrangement of elements hereinafter described and illustrated in the accompanying drawings, in which:

FIGURE 1 shows, somewhat diagrammatically, a turbojet aircraft engine with its associated main fuel supply system and afterburner fuel supply system, including our improved control apparatus, together with the principal connections therebetween.

FIGURE 2 is a vertical, sectional view, partly diagrammatic, of our improved afterburner fuel control apparatus, and FIGURES 2a, 2b and 2c are enlarged sectional views along the lines 2a—2a, 2b—2b, and 2c—2c, respectively of FIGURE 2.

FIGURE 3 is a partial view of FIGURE 2, showing a different position of the control linkage element.

FIGURE 4 shows a modification of the apparatus shown in FIGURE 2.

Our improved afterburner fuel control comprises a throttling valve which maintains a constant metering head across a variable-area, fuel metering valve, a metering valve positioning mechanism which varies said area in a selected manner in accordance with certain selected engine operating conditions, and a solenoid actuated shut-off valve which cuts off all fuel flow to the afterburners when not in operation.

The throttling valve maintains a constant metering head across the metering valve by means of an element which senses errors in metering head and moves the throttling valve to make correction. Metering head may be set at the desired level by changing the spring loading on either the sensing element or the bleed valve. The metering head is modulated in accordance with the temperature of the exhaust gases in the engine tail pipe, by an element responsive to said temperature.

Desired flow is obtained by controlling the port area of the metering valve. This is accomplished by a servo valve and piston arrangement where the servo valve is moved by changes in compressor discharge pressure and directs the piston to load or unload a spring to balance the new force on the servo valve. By this hydraulic amplifier a cam attached to the piston is positioned by an element responsive to compressor discharge pressure, and transfers the rise of said cam through a roller to said metering valve. The valve flow area thus becomes a selected function of the compressor discharge pressure.

High pressure oil from the engine or other source is used to actuate this servo system. In addition to the flow required to move the piston, oil is also used to spin the servo valve by means of a small hydraulic motor.

Figure 1:
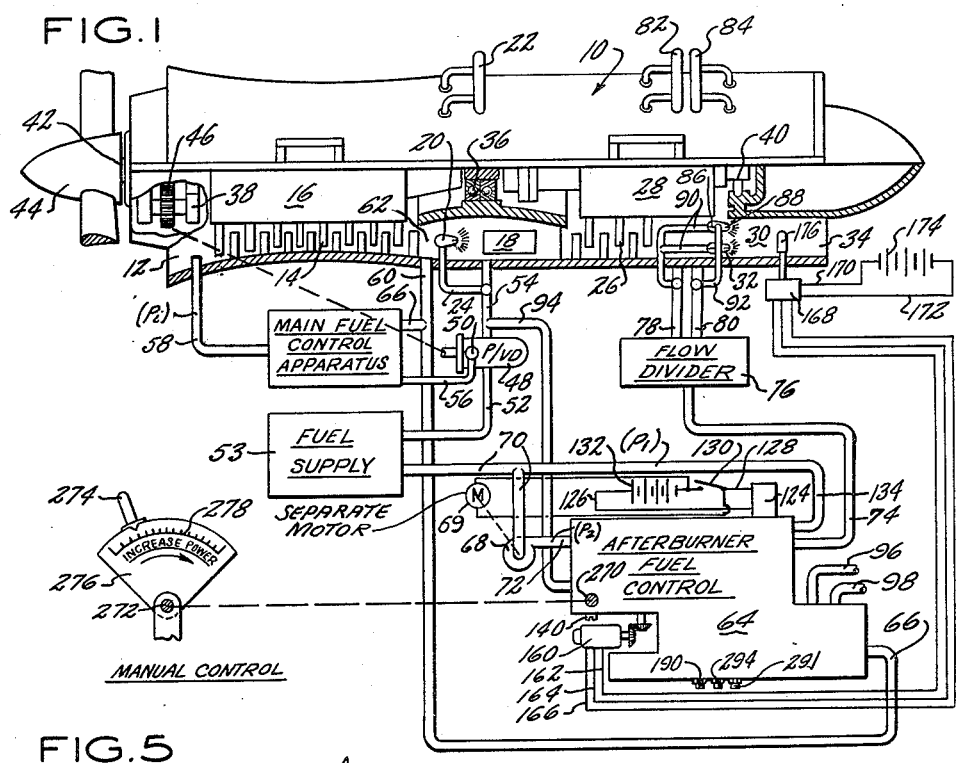

Referring now to the drawings, in FIGURE 1, there are shown the principal elements of the engine above referred to, comprising: a supporting casing 10, an air inlet 12, a multistage air compressor 14 with its rotor shaft 16, one of a number of main combustion chambers 18, one of a corresponding number of main fuel burner nozzles 20, connected to a generally circular fuel manifold 22 by means of a conduit 24, a multistage turbine 26 with its rotor shaft 28 connected to compressor rotor shaft 16; an afterburner combustion chamber 30 having therein a number of afterburner fuel nozzles 32, a tail pipe 34 for discharging combustion exhaust gases to the atmosphere; a center bearing 36 and end bearings 38 and 40 supported by casing 10, a propeller shaft 42 to which is fixed a propeller 44, and a gear train 46 connecting shafts 16 and 42 for rotating propeller 44 at a speed proportional to engine speed and for operating the fuel pumps and other accessories. The construction of an engine used solely for jet propulsion is similar to that of FIGURE 1, except for the omission of the propeller and propeller shaft and corresponding modification of the gear train. Also in a jet engine, since the power developed by the turbine is used only for operating the compressor and engine accessories, a single-stage rather than multistage turbine construction is generally employed.

The main fuel supply system to the engine includes a variable delivery fuel pump 48, driven from engine gear train 46, and having a fuel delivery varying means diagrammatically shown at 50. Pump 48 receives fuel under pressure through inlet conduit 52 from a source of fuel supply 53, and delivers fuel, through outlet conduit 54 and connecting conduit 24, to burner nozzles 20 in main combustion chamber 18. Fuel delivery varying means 50 is responsive to a variable control oil pressure in a conduit 56 which is regulated by the main fuel control apparatus, as disclosed in the copending application of Leighton Lee II, for "Control Apparatus," Serial No. 746,975, filed May 9, 1947, and assigned to the same assignee to which this application is assigned. The main fuel control apparatus is connected through a conduit 58 with air inlet 12, and through a conduit 60 with a chamber 62 at the discharge outlet of compressor 14, for the purpose described in the copending application cited.

The afterburner control apparatus 64, shown in detail in FIGURE 2, is connected to the same source of compressor discharge pressure ($P_d$) by a conduit 66 communicating with conduit 60.

Associated with the afterburner fuel control apparatus 64 is a centrifugal fuel pump 68 which draws fuel from a supply source 53 through connecting conduit 70 and delivers fuel to the afterburner control apparatus 64 through a connecting conduit 72. As shown in FIGURE 1, pump 68 is driven by an electric motor 69, connected through a switch 130 to a battery 132 (see column 5, lines 25–44).

Regulated fuel flows from control apparatus 64 through a conduit 74 to a flow divider 76, and from thence through conduits 78 and 80 to afterburner fuel manifolds 82 and 84, respectively. In afterburner combustion chamber 30 are a series of burner nozzles 32, each having a fixed slot 86 and an auxiliary slot 88, connected respectively through conduits 90 and 92 to conduits 78 and 80, whereby fuel is fed into and burned in combustion chamber 30.

After burner control apparatus 64 is connected through a conduit 94 to conduit 54 in the main fuel supply system, as further described hereinafter. Oil under pressure from the engine, or other source (not shown), enters apparatus 64 through a connecting conduit 96 and returns to its source through a conduit 98, also as further described hereinbelow.

Referring now to FIGURE 2, the afterburner fuel control 64 comprises a casing 100 which is divided by a horizontal wall 102 into an upper fuel chamber 104 and a lower oil chamber 106. Fuel under pressure ($P_2$) from pump 68 enters apparatus 64 through conduit 72, and flows through a balanced throttling valve 108 to a chamber 110 and thence through a balanced metering valve 112, into chamber 104, from which it is discharged through conduit 74 to flow divider 76. When the afterburner fuel control apparatus is not in operation, a shut-off valve 114 in chamber 104 closes and cuts off all fuel flow to the afterburner nozzles 32.

Shut-off valve 114 comprises a hollow piston which is biased towards its seat by a spring 116 and fuel under pressure ($P_{2r}$) from a passage 118, connected to chamber 110. Communication between valve 114 and passage 118 is controlled by a solenoid valve 120 which is biased toward its closed position by a spring 122, and is retracted to its open position by a solenoid 124, connected by wires 126 and 128, and a manually operated switch 130, to a battery 132. When valve 120 is closed, by closing switch 130 and energizing solenoid 124, the upper surface of valve 114 is under fuel boost pressure ($P_1$) supplied through a conduit 134, connected to conduit 70. The pressure ($P_3$) of the metered fuel in chamber 104 acts on valve 114 with a force which exceeds the downward force of spring 116 and pressure ($P_1$), when valve 120 is closed, and valve 114 is moved to its open position, as shown in FIGURE 2. However, when valve 120 is open, by opening switch 130 and deenergizing solenoid 124, the pressure ($P_{2r}$) from chamber 110, plus the force of spring 116, exceeds the force of pressure ($P_3$) and valve 114 is moved to its closed position, cutting off all fuel flow to the afterburner combustion chamber 30.

Throttling valve 108 is biased toward open position by a spring 136 and toward closed position by the fuel pressure differential acting on a bellows 138. The loading of spring 136 is adjusted by varying the position of its movable abutment 140 which has a stem, screw-threaded through the wall of casing 100 and locked in selected position by a lock nut 142. Bellows 138 is seated in a chamber 144 which communicates with chamber 110 through a restriction 146, and with chamber 104, through a port 148 whose flow area is controlled by a valve 150, biased toward closed position by a spring 152 whose loading is varied by a movable abutment 154, screw-threaded through the wall of casing 100. The lower end of abutment 154 carries a bevel gear 156 which engages a bevel gear 158 on the rotatable shaft of an electric motor 160, connected by wires 162, 164 and 166 to an amplifier 168 which is in turn connected by wires 170 and 172 to a battery 174 (see FIGURE 1). Amplifier 168 is also connected to a thermo-couple 176 which is located in tail pipe 34 and generates an electric motive force proportional to the temperature of the exhaust gases in said tail pipe. By virtue of this arrangement, the loading of spring 152 is varied in accordance with the temperature of the exhaust gases in tail pipe 34, so that an increase in said temperature rotates motor 160 in a direction to lower the position of abutment 154 and reduce the loading of spring 152, and vice versa. When the loading on spring 152 is thus reduced, valve 150 opens and permits an increased fuel flow from chamber 144. This increases the fuel pressure differential acting on bellows 138 and thereby decreases the opening of throttling valve 108, with a corresponding decrease in the pressure ($P_{2r}$) and fuel flow through metering valve 112, which lowers the temperature of the exhaust gases in tail pipe 34.

Chamber 110 is supplied with fuel from conduit 54 in the main fuel supply system through conduit 94 and restriction 178 which reduces the pressure downstream of said restriction to a value which is substantially equal to the pressure ($P_{2r}$) in chamber 110 when the afterburner fuel control apparatus is in operation. However, when said apparatus is idle (i.e., valve 114 closed, and switch 130 open), the pressure in 110 and conduit 72 decreases to boost pressure ($P_1$) in fuel tank 53, whereupon the higher pressure of the fuel entering chamber 110 through conduit 94 causes a reverse flow of fuel back through conduit 72, pump 68, and conduit 70, to tank 53.

This reverse flow has a cooling effect upon the afterburner fuel control apparatus which counteracts the heating effect of ambient temperature which may be as high as +300° F. when said apparatus is idle.

From the above description of the throttling valve 108 and its associated mechanism, it is apparent that said valve maintains a "constant" metering head across metering valve 112 by the action of bellows 138 which senses errors in metering head and moves valve 108 to make correction. The metering head across valve 112 may be readily changed by adjusting the position of abutment 140 which varies the loading on spring 136. Control of the metering head in this manner provides the sea level slope adjustment as desired.

With a constant metering head across valve 108, the rate of afterburner fuel flow is determined by the flow "area" through said valve. The flow area through metering valve 112 is controlled by the vertical position of said valve above its fixed seat, and said position is determined by the linkage mechanism in chamber 106.

This mechanism comprises a cam 180, pivotally mounted on a lug 182, extending from one side of a piston rod 184 (see FIGURES 2 and 2a), and carrying a roller 186, which contacts a disc 188 attached to the top of an adjustable stud 190 that is screw-threaded through the bottom wall of casing 100 and locked in desired position by a lock nut 192.

Piston rod 184 is slidably mounted in a casing 100 and carries at its left end a piston 194 which reciprocates in a cylinder 196. Near the right end of rod 184 is a laterally projecting arm 194, which carries a sleeve 198, mounted on arm 194 by means of a laterally projecting lug through which rod 194 extends and which is embraced between a pair of collars 200 and 202, secured in position on arm 194 by set screws. Slidably mounted in sleeve 198 is a rod 204 which serves as a stop to limit the downward travel of valve 112, as further described hereinafter.

Slidably and rotatably mounted in a bore 206 in the right end wall of casing 100, which is in axial alignment with piston rod 184, is a spool, servo valve 208 having lands 210 and 212 which just cover the end ports of passages 214 and 216 when said valve is in its central, neutral position. At its right end valve 208 is attached to the movable left end of a bellows 218 whose right end is fixed to the wall of a chamber 220 in casing 100 and whose interior is connected by conduits 66 and 60 to the compressor discharge chamber 62 of the engine. Also fixedly mounted to the wall of chamber 220 is an evacuated bellows 222 which has a movable left end of the same area as the movable end of bellows 218. A lever 224, pivoted to a fixed pivot 226, is articulately connected to valve 208 by a lug 227 on 224 which engages a circular groove 227–a in valve 208. Lever 224 is also connected to a stem 228 attached to the movable end of bellows 222.

Communicating with bore 206 are passages 230 and 232 which are respectively connected by conduits 96 and 98 to a source of oil under pressure and an oil return sump (not shown). A cross passage 234 connects chambers 106 and 220 with passage 232, and passages 236 and 238 connect passage 234 with bore 206. Passages 214 and 216 connect bore 206 with the right and left ends respectively of cylinder 196. Slidably mounted and keyed to the left end of valve 208 is a gear 240 which meshes with a gear 242, as shown in FIGURES 2 and 2b. A passage 244 connects the space between wall 100 and gears 240 and 242 with passage 230, so the high pressure oil acting on said gears rotates them as a fluid motor, whereby valve 208 is continuously rotated to prevent its sticking during operation. A spring 246 at its left end abuts the right end of rod 184, and at its right end, seats on collared disc 248 which is in pivotal contact with the left end of valve 208.

From the above description, it is clear that when the compressor discharge pressure ($P_5$) in bellows 218 increases, servo valve 208 moves to the left and permits the high pressure oil from passage 230 to flow through passage 216 to the left end of cylinder 196, while oil from the right end of said cylinder escapes through passages 214 and 98 to the oil return sump. This causes piston 194 to move to the right and compress spring 246, which in turn moves valve 208 back to its neutral position, wherein the entrance or escape of oil into and from cylinder 196 is blocked and piston 194 thus remains in its new position, corresponding to the increased pressure ($P_5$) in bellows 218. Conversely, a decrease in pressure ($P_5$) in said bellows moves piston 194 to the left, to a position corresponding to the reduced pressure ($P_5$) in bellows 218. From the foregoing, it follows that the horizontal movement of cam 180 is proportional to variations in compressor discharge pressure ($P_5$).

Riding the contoured upper face of cam 180 is a roller 250 which is pivotally mounted in the right end of a rocker arm 252 that is in turn pivoted to a fixed pivot 254. Riding on the upper face of arm 252 is a roller 256, pivotally mounted in a block 258 which reciprocates vertically in a sleeve 260 that is integral with a push rod 262, slidably mounted in casing 100. Rod 262 carries at its left end a roller 264 which rides on a cam 266 fixed to a shaft 270 that is connected to a shaft 272 of a pilot's manual throttle control lever 274 (see FIGURE 1). Associated with lever 274 is a quadrant 276 having a scale 278 to indicate the power output of the engine corresponding to any given position of said lever.

Contacting roller 256 is a plate 280 attached to the bottom of a stem 282 integral with fuel metering valve 112. Plate 280 is held in contact with roller 256 by a spring 284 which also biases valve 112 toward closed position.

From the foregoing description of elements 250—284, it is clear that the horizontal movement of cam 180, in response to changes in absolute compressor discharge pressure (i.e., $P_5$ in bellows 218, opposed by zero pressure in bellows 222), is converted, by roller 250, arm 252, roller 256 and plate 280, into a vertical movement of valve 112 which is a selected function of the horizontal movement of cam 180, depending upon the contours of cams 180 and 266, and the angular position of the latter, as determined by the position of manual control lever 274.

Rod 204 carries at its lower end a roller 286 which contacts a plate 288 whose vertical position may be adjusted by a screw stud 291 which is threaded through the bottom wall of casing 100 and locked in adjusted position by a lock nut 290. Hinged to the left end of plate 288 is an inclined plate 292 whose angular position may be adjusted by a screw 294 threaded through the bottom wall of casing 100 and locked in adjusted position by a lock nut 296.

*Static Sea Level (Slope) Adjustment (See FIGURE 2)*

Figure 5:
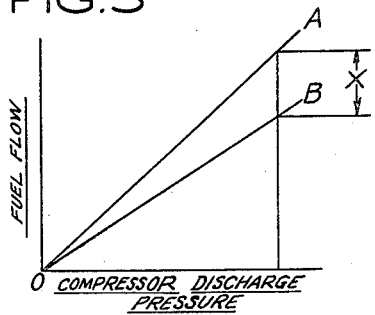
FIGURES 5, 6, 7 and 8 are diagrams showing certain operating characteristics of the apparatus shown in FIGURE 2.

We mentioned in column 2, lines 56 and 67, the need for a sea level static slope adjustment which is independent of high altitude fuel flow adjustment. While static sea level (slope) adjustment may be accomplished by adjusting the metering head across valve 112 by means of adjustable abutment 140, it is more desirable to select a metering head which will be constant at all times and adjust the sea level slope by changing the slope of cam 180. This cam is pivoted about a point 182 on its slope where the roller 250 rests at zero compressor discharge pressure ($P_5$). The metering valve 112 is set to be closed for this condition, so that we have zero afterburner fuel flow at zero ($P_5$). Any subsequent change in the slope of cam 180, metering head across valve 112, or throttle modulation (described below) will develop lines 0A and 0B radiating from the zero point (0) when said fuel flow is plotted against the pressure ($P_5$), as shown in FIGURE 5, wherein the vertical line X corresponds to the vertical range of adjustment of screw 190.

*Throttle Modulation (See FIGURE 2)*

Figure 6:
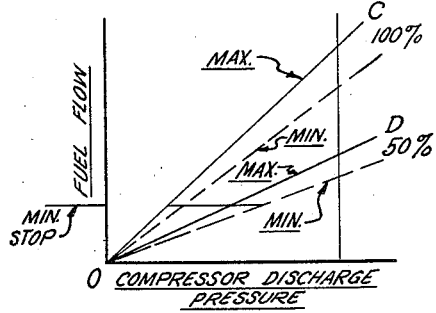

Modulation of the static sea level slope to 50% of its maximum slope is obtained through the dividing mechanism (cam 180 and arm 252) that divides the rise of cam 180 by any factor selected by the throttle (lever 274) from one to two. This fraction of the cam rise is transferred to the metering valve 112 so that it will pass the desired fraction of flow. This dividing is accomplished by follower arm 252, roller 256, valve plate 280, and roller yoke 260. Follower arm 252 has its pivot point 254 located so that if roller 250 follows the top slope of cam 180 to the horizontal position of said cam, corresponding to zero value of compressor discharge pressure ($P_5$), the top surface of arm 252 is parallel to valve plate 280. In this parallel condition, the movement of roller 256, would have no effect, so that at zero ($P_5$) and zero afterburner fuel flow, we have zero modulation. As follower arm 252 becomes angularly disposed to plate 280, the movement of roller 256 will cause a change in position of valve 112, if we assume some normal position of cam 180. When roller 256 is at the high end of follower arm 252 and directly over the roller 250, the rise of cam 180 will be directly transferred to the metering valve 112. This is the 100% position. Moving the roller 256 half the distance from the 100% position to the fulcrum 254 of the follower arm 252 will lower the metering valve to half of the opening in the 100% position, and said valve will pass 50% of the full fuel flow for any compressor discharge pressure ($P_5$), as shown by lines 0C and 0D in FIGURE 6. Intermediate percentages of cam 180 rise are transmitted in the same manner to the valve 112 to provide throttle modulation for various sea level slopes, as indicated in FIGURE 6. Movement of throttle lever 274 is utilized to position roller 256 through yoke 260 and cam 266 which is positioned by the throttle lever 174.

*Automatic Limitation of Throttle Modulation (See FIGURE 3)*

Figure 7:
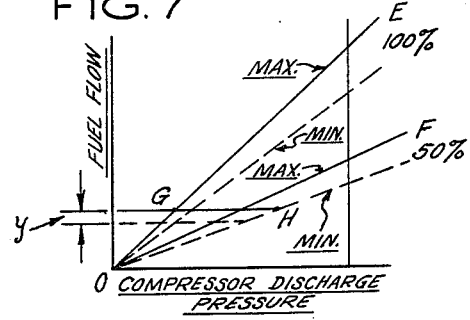

Throttle modulation is automatically limited below the desired value of compressor discharge pressure ($P_5$) by minimum flow stop 204 which limits the closing of valve 112 and prevents throttle modulation below the selected value of ($P_5$) and afterburner fuel flow. For variations in static sea level slope the lines 0E and 0F in FIGURE 7 will interest the minimum afterburner fuel flow line GH at various values of ($P_5$), as shown in FIGURE 7. In FIGURE 7, the vertical distance Y corresponds to the range of adjustment of screw 291. This can be corrected by adjusting the minimum flow stop 204 to obtain a given point of coincidence if this is desired. Minimum flow stop 204 can also be adjusted in flight to provide the maximum range of throttle modulation for each engine by providing a remote drive, as indicated by the remote positioning motor 298 in FIGURE 3.

*Altitude Adjustment (See FIGURE 3)*

Figure 8:
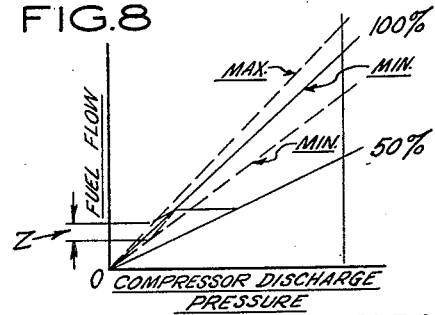

The minimum flow stop 204 is carried by piston rod 184 along with cam 180 so that at the selected value of ($P_5$) said stop will begin to descend on the adjustable slope 292. At the same time, cam follower arm 252 will run off of cam 180, so that the position of valve 112 will be determined by the slope of 292 below the desired value of ($P_5$), as indicated in FIGURE 8, wherein the vertical distance Z corresponds to the range of adjustment of screw 294. A remote positioning motor 300 (FIGURE 3) is provided for adjusting the slope of 292 in flight.

High Ambient Temperature

To meet the problem introduced by high ambient temperatures and fuel vaporization; high pressure oil is used for servo valve 298 system and main engine fuel is circulated through control apparatus 64 back to the tank 53 to prevent a detrimental rise in temperature when the control is idle.

Contouring Fuel Schedule

It will be noted that the afterburner fuel flow schedule may be contoured as desired by suitably shaping the cam 180 or 292, without disturbing throttle modulation which will always give the same percentage of fuel flow for the same position of the throttle lever 274.

Alternate Electrical Servo (See FIGURE 4)

The hydraulic servo system for positioning the cam 180 for values of compressor discharge pressure ($P_5$) shown in FIGURES 2 and 3, may be replaced by an electrical servo arrangement as shown in FIGURE 4, wherein an electrical pick up element 302 connected by a rod 304 to bellows 218, generates an electro-motive force that is proportional to the movement of rod 304. This force (E.M.F.) is transmitted through wires 306 and 308 to an amplifier 310 and from thence through wires 312, 314 and 316 to a reversible motor 318 which is connected through reduction gears 320, pinion 322 and rack 324 to rod 184. By virtue of elements 302—324 the horizontal movement of rod 184, cam 180 and stop 204 is proportional to variations in compressor discharge pressure ($P_5$) in bellows 218.

While we have shown and described the preferred embodiment of our invention, we desire it to be understood that we do no limit ourselves to the precise construction and arrangement of elements disclosed by way of illustration, since these may be changed and modified by those skilled in the art without departing from the spirit of our invention or exceeding the scope of the appended claims.

We claim:

1. In combination with an aircraft turbojet engine having an air compressor, a main combustion chamber, a gas turbine, an afterburner combustion chamber for reheating the exhaust gas from said turbine, a main fuel system, including a fuel source, for supplying fuel to said main combustion chamber, an afterburner fuel system, connected to said source, for supplying fuel to said afterburner combustion chamber; an afterburner fuel control apparatus comprising: means, including a contoured cam, for automatically regulating said afterburner fuel supply always solely in accordance with selected coordinated functions of the unmodified absolute discharge pressure of said compressor as determined by the contour of said cam, and in accordance with the temperature of said exhaust gases, and means for returning a portion of said main fuel supply through said apparatus back to said source, to cool said apparatus when not in operation.

2. In combination with an aircraft turbojet engine having an air compressor, a gas turbine, a combustion chamber for reheating the exhaust gases from said turbine, a tail pipe for discharging said gases as a propulsive jet to the atmosphere, an operatively associated throttle control means, and a fuel pump for delivering fuel to said chamber; a fuel control apparatus comprising: means, including a contoured cam, for always regulating the delivery of fuel from said pump to said chamber in accordance with selected coordinated functions of the unmodified absolute discharge pressure of said compressor as determined by the contour of said cam, and in accordance with a selected function of the temperature of the exhaust gases in said tail pipe, and manually operable means, independent of said throttle means, for shutting off said fuel delivery to said chamber.

3. In combination with an aircraft turbojet engine having an air compressor, a gas turbine, a combustion chamber for reheating the exhaust gases from said turbine, a tail pipe for discharging said gases as a propulsive jet to the atmosphere, an operatively associated throttle control means, and a fuel pump for delivering fuel to said chamber; a fuel control apparatus comprising: a fuel metering valve, means for varying the flow area through said valve by varying its position relative to a fixed seat therefor; means, including a contoured cam, for always regulating the delivery of fuel from said pump to said engine in accordance with selected, coordinated functions of the unmodified absolute discharge pressure of said compressor, by varying said position of said valve solely in accordance with said functions of said compressor discharge pressure, as determined by the contour of said cam, and adjustable means for selectively adjusting the minimum opening of said valve.

4. A fuel control apparatus according to claim 3, wherein said valve position varying means is actuated by a linkage mechanism controlled by a rotating servo valve which is responsive to said compressor discharge pressure.

5. A fuel control apparatus according to claim 3, having mutually independent means for adjusting the position of said valve in accordance with high altitude, and static, sea level, engine requirements; said adjusting means being operable independently of said throttle control means.

6. A fuel control apparatus according to claim 5, having means, independently of said throttle control means, for automatically modulating said sea level adjustment in accordance with the position of said throttle control.

7. A fuel control apparatus according to claim 3, having valve means for maintaining a constant fuel metering head under varying conditions of engine operation and means, downstream of said last-mentioned valve means, for automatically adjusting the value of said constant metering head in accordance with the temperature of the exhaust gases in said tail pipe.

8. A fuel control apparatus according to claim 7, having manually adjustable means for adjusting said constant head maintaining means whereby said metering head may be adjusted as desired to meet engine static, sea level operating requirements.

9. In combination with an aircraft turbojet engine having an air compressor, a gas turbine, a combustion chamber for reheating the exhaust gases from said turbine, a tail pipe for discharging said gases as a propulsive jet to the atmosphere, an operatively associated throttle control means, and a fuel pump for delivering fuel to said chamber; a fuel control apparatus for automatically regulating said fuel delivery in accordance with the rate of mass air flow through said engine, comprising: a fuel metering orifice; means for maintaining a substantially constant metering head across said orifice, under varying operating conditions; a movable metering valve whose movement is responsive to the unmodified, absolute discharge pressure of said compressor, for always varying the flow area through said orifice in accordance with said pressure, whereby said fuel delivery is automatically regulated in accordance with said rate of air flow, as measured by said pressure; and contoured cam means for moving said valve so that its flow area is varied in accordance with a selected, variable function of said discharge pressure, as determined by the contour of said cam.

10. In combination with an aircraft turbojet engine having an air compressor, a gas turbine, a combustion chamber for reheating the exhaust gases from said turbine, a tail pipe for discharging said gases as a propulsive jet to the atmosphere, an operatively associated throttle control means, and a fuel pump for delivering fuel to said chamber; a fuel control apparatus for automatically regulating said fuel delivery in accordance with the rate of mass air flow through said engine, comprising: a fuel metering orifice; means for maintaining a substantially constant metering head across said orifice, under varying operating conditions; a movable metering valve whose movement is responsive to the unmodified, absolute discharge pressure of said compressor, for always varying the flow area through said orifice in accordance with said pressure, whereby said fuel delivery is automatically regulated in accordance with said rate of air flow, as measured by said pressure; and contoured cam means for varying the flow area of said metering valve by variably positioning said valve, with reference to a fixed seat therefor, in accordance with a selected variable function of said discharge pressure, as determined by the contour of said cam.

References Cited in the file of this patent

UNITED STATES PATENTS

| | | |
|---|---|---|
| 1,297,803 | Davis | Mar. 18, 1919 |
| 2,503,048 | Ifield | Apr. 4, 1950 |
| 2,520,967 | Schmitt | Sept. 5, 1950 |
| 2,566,373 | Redding | Sept. 4, 1951 |
| 2,570,591 | Price | Oct. 9, 1951 |
| 2,598,674 | Burgess | June 3, 1952 |
| 2,616,254 | Mock | Nov. 4, 1952 |
| 2,622,393 | Edwards et al. | Dec. 23, 1952 |
| 2,642,718 | Pearl | June 23, 1953 |
| 2,644,513 | Mock | July 7, 1953 |
| 2,645,293 | Ogle et al. | July 14, 1953 |
| 2,728,192 | Ross | Dec. 27, 1955 |
| 2,762,194 | Kunz et al. | Sept. 11, 1956 |
| 2,774,215 | Mock et al. | Dec. 18, 1956 |
| 2,780,054 | Coar et al. | Feb. 5, 1957 |